July 16, 1929.  J. J. TRESSEL  1,720,935
COMBINATION REFRIGERATING DISH
Filed Oct. 8, 1926  2 Sheets-Sheet 1
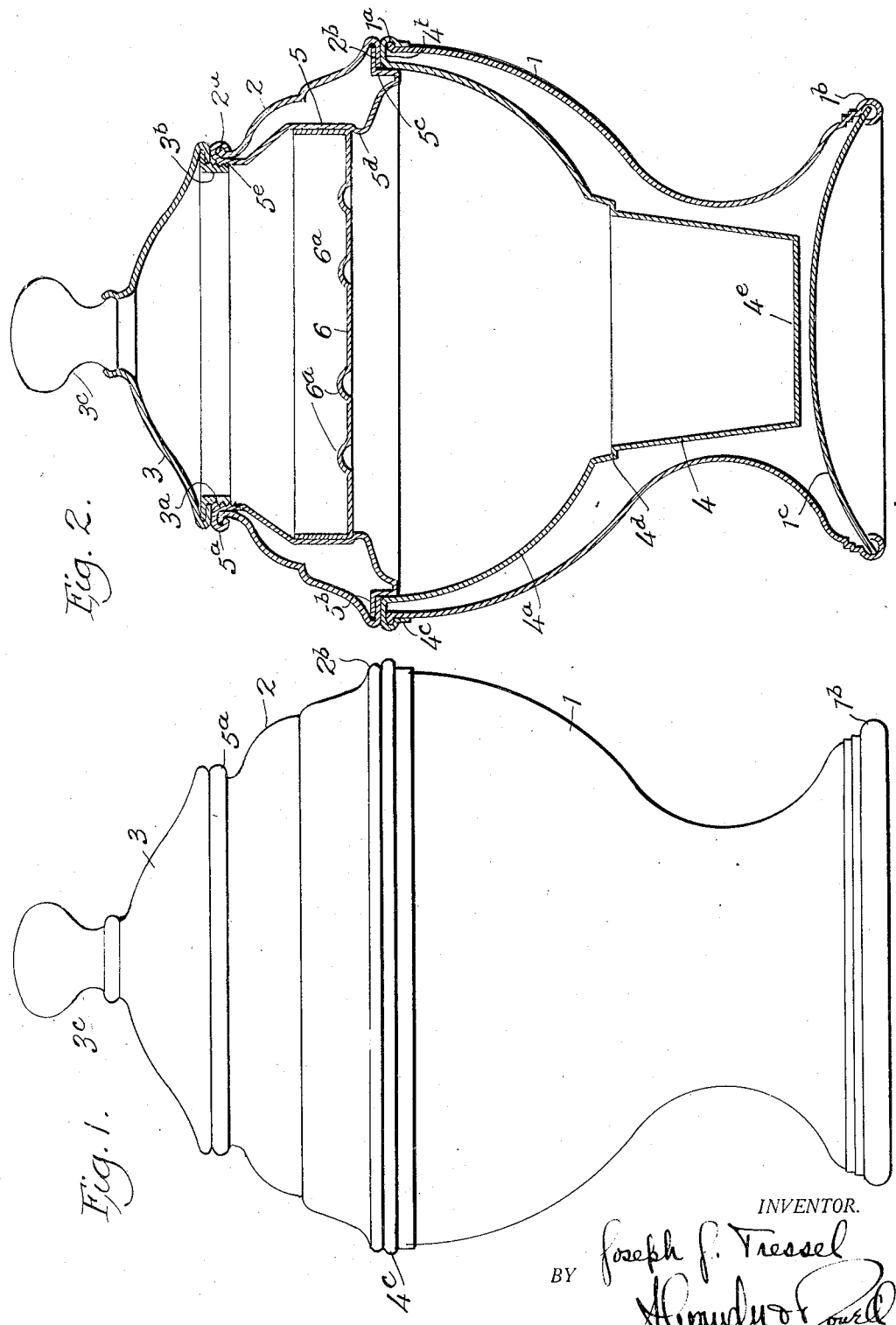
INVENTOR.
Joseph J. Tressel
BY
Alexander Powell
ATTORNEYS

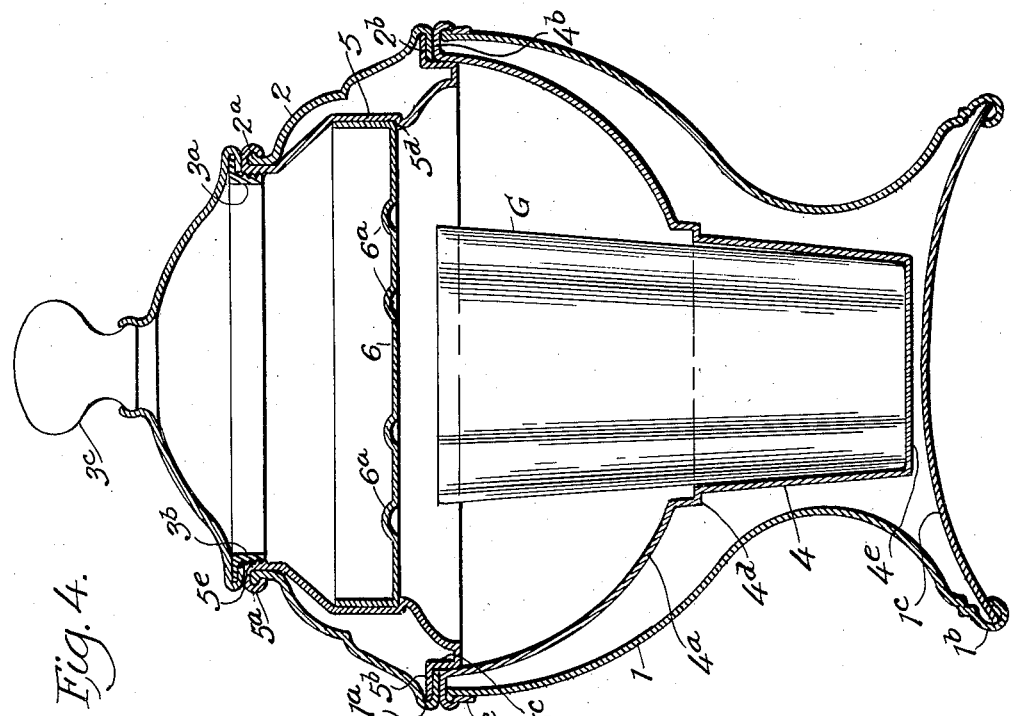

Patented July 16, 1929.

1,720,935

UNITED STATES PATENT OFFICE.

JOSEPH J. TRESSEL, OF CINCINNATI, OHIO, ASSIGNOR TO DRI-KOLD MANUFACTURING COMPANY, OF BIRMINGHAM, ALABAMA, A CORPORATION OF DELAWARE.

COMBINATION REFRIGERATING DISH.

Application filed October 8, 1926. Serial No. 140,343.

This invention is a novel improvement in combination refrigerating dishes and the like, and the principal object thereof is to provide a simple, novel, and efficient dish adapted to separately hold a plurality of food containers of various shapes within the body of the dish, the cover of the dish being provided with means for holding a refrigerant particularly carbon dioxide snow.

Another object of the invention is to provide a novel combination dish particularly adapted for use in serving frozen foods, such as fruit salad, ice cream, grape-fruit, fruit-juice, ginger ale, etc.; the dish being so shaped that food receptacles of various shapes may be separately inserted and supported within the dish.

I will explain the invention with reference to the accompanying drawings which illustrate one practical embodiment thereof to enable others to adopt and use the same, and will summarize in the claims the novel features of construction, and the novel combinations of parts, for which protection is desired.

In said drawings:

Figure 1 is an elevation of the dish.

Fig. 2 is a vertical section through the dish.

Fig. 3 is a vertical section through the dish showing a sherbet, ice-cream, fruit-salad, etc., receptacle retained and supported therein.

Fig. 4 is a vertical section through the dish showing a drinking glass or the like retained and supported therein.

As shown in the drawings, my novel combination dish preferably comprises three separable parts; a body 1, a cover 2, and a top 3 for the cover. The dish may be made in any desired shape and may be either round, oval, square, hexagonal, octagonal, etc., but as shown in the drawings the body 1 of the dish flares upwardly and is open at the top, the body contracting near the base and again flaring outwardly at the base to form a suitable support. The body 1 is preferably formed of a single piece of metal and the top edge of the body 1 is provided with an outwardly spun flange $1^a$. The lower edge of the body 1 is preferably swaged or turned inwardly as at $1^b$ to secure the convex bottom plate $1^c$ of the body, the flange $1^b$ being bent inwardly around the edges of the bottom plate $1^c$ to securely bind the bottom plate $1^c$ to the under side of the body 1.

Within the body 1 is a lining 4, the upper end $4^a$ of which is substantially semi-globular in shape, the upper edge of said portion $4^a$ being provided with an outwardly extending flange $4^b$, the outer edge of which is lapped and swaged, as at $4^c$, over the spun flange $1^a$ of the body 1 to make an air tight connection. The lower end of the semi-globular portion $4^a$ of lining 4 terminates into a shoulder $4^d$ for the purpose of forming a seat for a sherbet, ice-cream, fruit-salad, etc., dish H which, when placed in the dish as shown in Fig. 3 will seat upon the flange $4^d$ and will thus be supported within the dish opposite the semi-globular portion $4^a$ of the lining 4, the upper edge of dish H being substantially flush with the upper portion of the body 1 as shown in Fig. 3. Below the shoulder $4^d$ the lining is formed into a conical shape, and extends down to a point slightly above the bottom plate $1^c$ of the body. The bottom of the lining 4 is closed by plate $4^e$. The lower portion of the lining 4 being conical in shape is adapted to retain and support a glass G or tumbler which may be inserted into position in the lining 4, as shown in Fig. 4 when the sherbet, ice-cream, fruit-salad, etc., dish H has been removed.

The dead air space formed between the body 1, lining 4 and bottom plate $1^c$ prevents rapid radiation through the body, and the joints between the body, lining, and bottom plate may be welded or otherwise formed air-tight. Lining 4 is preferably made in one piece, as shown, but could be made in several pieces suitably joined together.

Cover 2 is preferably open at its top and bottom but smaller in diameter at the top than at the bottom, the diameter of the bottom of cover 2 being made to suit that of the upper end of body 1. As shown the cover is preferably composed of inner and outer annular members 2 and 5 spaced apart but connected above and below so as to form a closed annular dead-air space between them, said cover having an opening at the upper end of the air space which opening is closed by a supplemental cover or top 3; and within the opening near its lower end is a refrigerant holding pan or bottom 6, as hereinafter explained. The upper edge or cover 2 is preferably provided with a spun flange $2^a$, the bottom edge of cover 2 being provided with an in-turned horizontally disposed flange $2^b$. A lining 5 is provided within the cover 2, the upper edge of the lining 5 being lapped and swaged, as at $5^a$, over the spun flange 2ᵃ of cover 2, the lower end of lining 5 being provided with an outwardly extending flange 5ᵇ adapted to overlie the flange 2ᵇ of cover 2 whereby the portion between cover 2 and lining 5 will form a dead-air space within the cover to prevent rapid radiation therethrough. Preferably the lining 5 at its lower end, is provided with a vertical disposed flange 5ᶜ adapted to fit within the upper end of lining 4 of the body 1 when the cover 2 is in place on the body 1, to maintain the cover in proper alinement and position on the body 1.

Within the cover 2 is a pan 6 which is preferably cup-shaped and forced up into the lining 5 from the lower end, the portion of the lining 5 immediately below the pan being preferably swaged inwardly as at 5ᵈ to prevent pan 6 from being removed from its position in the cover 2. Pan 6 is adapted to hold the refrigerant, such as carbon dioxide snow, which is inserted into the pan 6 of the cover through the opening in the upper end of the cover. Preferably the pan 6 is provided with knobs 6ᵃ which are pressed upwardly from the bottom of the pan as shown in Figs. 2, 3, and 4.

The upper end of lining 5 of cover 2 is preferably provided with internal threads 5ᵉ adapted to be engaged by external threads 3ᵃ on a depending flange 3ᵇ, on the bottom of top 3 for the cover, the top 3 having a knob 3ᶜ on its upper end whereby top 3 may be readily screwed into or out of engagement with the cover 2 to permit the refrigerant to be placed in the pan 6. The supplemental cover 3 may be of any desired construction, but is preferably made of a single piece of sheet metal.

The construction of the dish as above described provides dead air spaces between the body 1 and its lining 4, and between the cover 2 and its lining 5 to prevent rapid radiation therethrough. The pan 6 is preferably made of light material of a single thickness to allow the cooling effect of the refrigerant placed in the cover 2 to rapidly radiate through the food products placed in the body of the dish. Access to the pan 6 can be readily had through the top 3.

My combination dish may be used with or without the glass G or sherbet, ice-cream, fruit-salad, etc., dish H, and hence provides a three-in-one refrigerant dish. I do not consider my invention limited to the exact form shown in the drawings for obviously changes may be made therein within the scope of the claims.

I claim:

1. For a dish of the character specified, a cover comprising an outer casing open at the top and bottom; a lining within the casing spaced therefrom and connected to the casing at its upper and lower ends to form a dead air space; a refrigerant holding pan swaged into said lining and forming a bottom for said cover; and means in the cover for obtaining access to said pan.

2. For a dish of the character specified, a cover comprising an outer casing open at its top and bottom; a lining within the casing spaced therefrom and connected to the casing at its upper and lower ends to form a dead air space; a refrigerant holding pan swaged into said lining adjacent the lower end thereof and forming a bottom for the cover; and a removable closure in the upper end of the cover for obtaining access to the interior of the cover above the pan.

3. A dish of the character specified, comprising an outer casing closed at its bottom and open at its top; a lining within said casing and spaced therefrom; a cover for said dish having a double wall forming a dead air space; a refrigerant holding pan swaged into said cover; and means in said cover for obtaining access to said pan.

4. A dish of the character specified, comprising an outer casing closed at its bottom and open at its top; a lining within said casing and spaced therefrom, the upper portion of the lining being semi-globular and the lower portion thereof circular; a cover for said dish having a double wall forming a dead air space; a refrigerant holding pan in said cover; and means in said cover for obtaining access to said pan.

5. A dish of the character specified, comprising an outer casing closed at its bottom and open at its top; a lining within said body and spaced therefrom, the upper portion of the lining being semi-globular and the lower portion thereof substantially cylindrical; said lining having a shoulder formed between said portions and adapted to form a seat for a receptacle inserted in the upper portion of the lining; a cover for said dish having a double wall forming a dead air space; a refrigerant holding pan in said cover; and means in said cover for obtaining access to said pan.

6. A combination dish of the character specified, comprising a casing closed at its bottom and open at its top; a lining in said casing spaced therefrom and connected thereto at its upper end forming a dead air space; the upper portion of the lining being substantially semi-globular and adapted to hold a semi-globular article, and the lower portion of the lining being contracted and adapted to separately hold a tumbler.

7. A combination dish of the character specified, comprising a casing closed at its bottom and open at its top; a removable cover adapted to close the upper end of said casing; a lining in said casing spaced therefrom and connected thereto at its upper end forming a dead air space; the upper portion of the lining being substantially semi-globular and adapted to hold a semi-globular article and the lower portion of the lining being contracted and adapted to separately hold a tumbler.

8. In a dish as set forth in claim 7, said cover having a double wall forming a dead air space; a refrigerant holding pan in said cover; and means in the cover for obtaining access to said pan.

9. In a dish of the character specified, a casing; a cover therefor comprising an annular outer member and an annular lining within said member but spaced therefrom to form a closed annular dead-air space, a refrigerant holding pan in the lower portion of said cover, and a removable top closing the opening in the cover above the pan.

10. In a dish of the character specified, the combination of a body comprising an outer casing closed at its bottom and open at its top, a lining within said casing and spaced therefrom to form an air space around it, the upper and lower portions of said lining being respectively shaped to receive and hold bodies of different shapes, a cover for said body having a double wall forming a dead air space, a pan in said cover for holding a heat transfer medium, and means in said cover for obtaining access to said pan.

In testimony that I claim the foregoing as my own, I affix my signature.

JOSEPH J. TRESSEL.